United States Patent Office 3,711,293
Patented Jan. 16, 1973

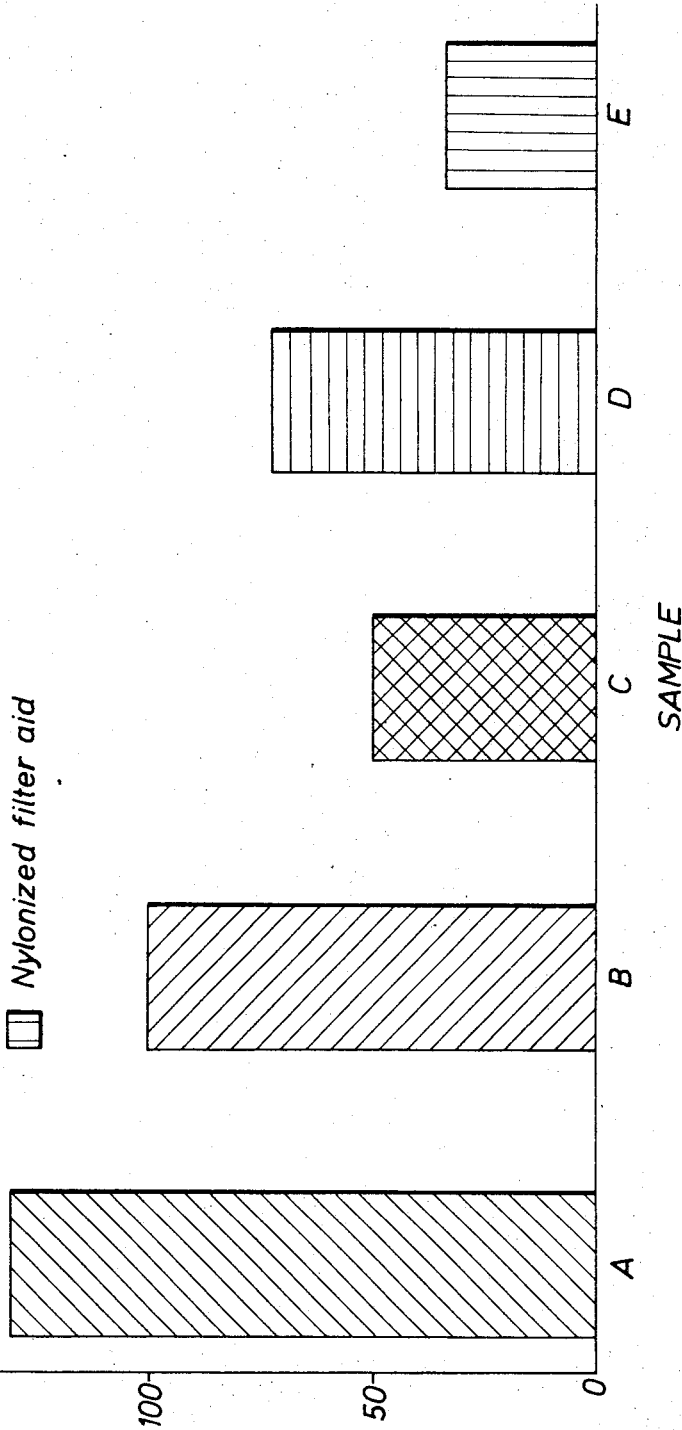

3,711,293
CLARIFYING AND STABILISING BEER
Kenneth H. Geiger and Hubert LeMaire, London, Ontario, Canada, assignors to Labatt Breweries of Canada Limited, London, Ontario, Canada
Filed Jan. 9, 1970, Ser. No. 1,856
Int. Cl. C12h 1/00
U.S. Cl. 99—48
5 Claims

ABSTRACT OF THE DISCLOSURE

Fermented beverages are clarified and stabilised by treating with kieselguhr encapsulated or coated with a polyamide resin.

BACKGROUND OF THE INVENTION

Field of the invention

This invention is broadly concerned with the selective adsorption of solute materials from fluids. More specifically, it relates to the use of natural or synthetic, insoluble, particulate silica and silicate materials, for instance, kieselguhr or a silica gel, that have been modified with polyamide resins to adsorb and remove solute materials from a fluid material.

The primary field of application of the modified silica and silicate materials is in clarifying and stabilising beer, or related fermented beverages such as cider, by the selective removal therefrom of deleterious solute components. For convenience, the description which follows is restricted to the use of the modified materials in adsorbing solute materials from beer. However, in its broader aspect, this invention contemplates the use of the polyamide-modified silica or silicate materials for the removal of a polyamide and/or silicate adsorbable solute from any fluid in which the solute is present. The term "solute" is used herein to include both materials actually dissolved in true solution, and materials which form solutions through colloidal dispersions in a liquid fluid.

Description of the prior art

Fermented beverages such as beer when chilled or held over extended periods of time at room temperature, gradually lose their original clarity through the formation of a non-biological haze. It is generally accepted at the present time that this non-biological haze is produced basically by the combination of protein and tannin molecules in beer, with the formation of particles of optical size.

Beer today is widely distributed in convenient containers such as glass bottles and cans. Such containers are subject to a wide variety of temperature and other storage conditions for varying lengths of time, as a result of which, there is a tendency for a haze to develop in the beer in the interval before consumption. It is, of course, necessary from the standpoint of consumer acceptance, that the individual containers of beer remain brilliant in visual appearance and pleasing in taste until consumption. Since the container prior to opening may be stored for long periods of time under chilling conditions, it is necessary that the beer withstands such low temperature storage without the marked development of a haze. It must also, needles to say, withstand the relatively high temperatures which may be experienced during storage, and the effects of oxidation, time and transportation. Accordingly, in order to increase the shelf-life of beer, thereby enhancing consumer appeal, by preventing or minimising haze formation, the brewing industry at the present time customarily treats the beer by one of a number of standard clarifying and stabilising procedures. Thus, for instance, the beer may be treated with a polyamide resin in accordance with the method described in the specification of Canadian Pat. No. 639,366. This specification teaches the reduction of haze in a fermented beverage such as beer by contacting the beer with a polyamide resin.

The polyamides are semi-selective adsorbents with great affinity for polyphenolic compounds such as anthocyanogens present as part of the tannin complex. Much evidence has been accumulated over the years which indicates that polyphenolics, as tannins, are constituents of beer haze so that it can be readily understood why polyamide treatment benefits beer stability. It is also believed that polyphenolics may have an influence on flavour or oxidation stability of beer. Thus, it will be evident that treatment of beer with polyamides represents a potentially important step in the brewing process. However, the treatment of beer with polyamides as a means of stabilising the beer has not attained the widespread acceptance that might be expected or predicted from the good results attendant upon its use for this purpose. A significant factor discouraging the use of polyamides in beer processing is the relatively high cost of these materials. Thus, in practise, it is found that about 10 to 40 lbs. dry polyamide per 100 barrels of beer are usually required to obtain the degree of stability sought. At current prices, based on polyhexamethylene adipamide (nylon 66) of a particle size distribution suitable for this purpose, this means that the raw material cost alone is at least around $30 per 100 barrels or 30¢ per barrel. This compares unfavourably with the cost, say, of a clay (e.g. "Clearfil"—a synthetic silicate which costs today about 60¢/lb. and 5 lbs. are typically required for each 100 barrels, i.e. approximately 3¢ per barrel), which is an alternative material that the brewer may use for this purpose. Another significant adverse factor is associated with the unsuitability of polyamide powders to filtration procedures. This means that, in practise, the polyamide treatment is usually effected simply by adding polyamide powder to the beer contained in a conditioning tank, and mixing the powder and beer by stirring occasionally over a period of time. In practise, this simple addition procedure takes much longer to remove an equivalent amount of the polyphenols than would be required were it possible to filter the beer through a permeable bed of polyamide powder. Moreover, the polyamide powder must be recovered from the beer, and, compared to filtration, this involves an additional process step. Aside from this disadvantage, some of the expensive nylon powder is usually lost in the recovery step and, indeed, a residual amount often remains behind in the beer, which can give rise to difficulties in subsequent processing.

BRIEF STATEMENT OF THE INVENTION

A primary object of this invention is to improve upon prior art practices relating to stabilising and clarifying ber with polyamide resins.

Another, more specific, object is to provide a novel composition of matter containing the polyamide resins and adapted to be formed into a filter bed that is permeable to fluids like beer.

Still further objects of the invention will be apparent from the following description and the accompanying drawing in which the single figure illustrates in graph form the advantageous results in clarifying and stabilising beer according to this invention.

This invention is based on the finding that significant practical improvements in the prior art polyamide treatment of beer can be attained by using the polyamide resins in a particular form, and in combination with one or more other specified silica or silicate materials.

The present invention, therefore, in its specific aspect, provides a method of clarifying and stabilising beer and like fermented beverages such as cider, which comprises filtering the beer or like fermented beverage through a filter bed comprising a composition of matter containing a minor amount by weight of a polyamide resin and, as a support material, a major amount by weight of a silica or silicate material having a particle size of between about 4 and about 40 microns and a high surface area, said polyamide resin serving to modify the support material.

Advantageously, the composition of matter is composed of between about 2 and about 30%, more preferably between about 5 and about 20%, by weight based on the weight of support material, polyamide resin.

On filtering beer through a mass or bed of such a composition of matter, it is clarified and stabilised by the removal, through adsorption by the polyamide, of polyphenolic compounds present as part of the tannin complex.

DETAILED DESCRIPTION OF THE INVENTION

In the practice of this invention, the preferred support material is kieselguhr (diatomaceous earth), which is a soft earthy material composed of the siliceous skeletons of small aquatic plants called diatoms. It generally appears as a whitish powder consisting essentially of frustules of the diatoms. Advantageously, the kieselguhr is present in calcined form as results from subjecting natural kieselguhr to a high temperature, say, 1800° F. for a brief period. The kieselguhr may be employed in combination with a small proportion of some other material such as asbestos or the like. Typical calcined kieselguhrs that have been successfully used in the practice of this invention are "Celatom FP-4 and FP-12" (available from Eagle-Pitcher Industries, Inc., Ohio), "Celite" grade kieselguhrs such as "Standard Super-Cel" or "Hyflo Super-Cel" and "Fibra-Flo" grade kieselguhrs (both "Celite" and "Fibra-Flo" kieselguhrs available from Johns-Manville Corp., N.Y.). The "Fibra-Flo" material contains variable small amounts of asbestos. Data relating to some of the properties of typical calcined kieselguhrs are shown in the table below.

TABLE I

| Property | Kieselguhr | | |
|---|---|---|---|
| | Celatom FP-4 | Standard Super-Cel | Hyflo Super-Cel |
| Color | (1) | (2) | (2) |
| Structure | (3) | (4) | (4) |
| Density (lbs. cu. ft.): | | | |
| Dry | | 8.0 | 9.0 |
| Wet | 19-20 | 17.6 | 17.6 |
| Average particle size ($\mu$) | 5 | 6 | 8-10 |
| pH (10% aqueous slurry) | 6.5-7.0 | 7.0 | 10.0 |
| Specific gravity | 2.25 | 2.15 | 2.30 |
| Relative flow rate (natural=1) | | 2 | 5 |
| Particle size distribution (wt. percent of product): | | | |
| 0 to 2$\mu$ | | 6 | 3 |
| 2 to 6$\mu$ | 13.0 | 37 | 25 |
| 6 to 10$\mu$ | 40 | 25 | 22 |
| 10 to 20$\mu$ | 28 | 21 | 30 |
| >20$\mu$ | 13 | 11 | 20 |
| Approx. chemical analysis (percent): | | | |
| Ignition loss | 0.00 | 0.5 | 0.2 |
| $SiO_2$ | 91.57 | 91.1 | 89.6 |
| $Al_2O_3$ | 4.70 | 4.0 | 4.0 |
| $Fe_2O_3$ | 1.55 | 1.3 | 1.5 |
| CaO | 1.20 | 0.5 | 0.5 |
| MgO | 0.18 | 0.6 | 0.6 |
| Other oxides | 0.80 | 1.5 | 3.7 |

1 Pink.
2 White.
3 Calcined.
4 Flux calcined.

The salient features about the foregoing, as with essentially all kieselguhrs, which make them so useful in the practice of this invention are the high porosity, low density and relatively large surface area.

While kieselguhr is the preferred support material, other silica or silicate materials, especially silica gel or magnesium silicate clays, may be employed for this purpose.

Advantageously, the polyamide resin is a polylactam formed from a lactam having 3 to 18 carbon atoms or a polyamide formed by reaction of an organic polyamine, preferably a hydrocarbon polyamine such as a hydrocarbon diamine containing 2 to 18 carbon atoms such as alkylene diamine with a polycarboxylic acid or anhydride, preferably of the formula $R(COOH)_2$ wherein R is a divalent hydrocarbon group, preferably an alkylene group containing from 2 to 18 carbon atoms.

A preferred polyamide for use in this invention is poly(hexamethylene adipamide) (nylon 66) either as a homopolymer or as a copolymer with a minor amount of polyepsilon caprolactam (nylon 6). Particularly suitable polyamides include, for example, that available under the trade name "Zytel" from E. I. du Pont de Nemours and that available under the trade name "Polypenco" from Polypenco Canada Ltd., Industrial Plastics Division, Ontario, Canada. Properties of a typical poly(hexamethylene adipamide) are shown in the table below.

TABLE II

| Property: | Poly(hexamethylene adipamide) |
|---|---|
| Relative density (gm./cm.$^3$) | 1.14 |
| Water absorption (percent) | 1.3 |
| Melting point (° C.) | 250 |
| Molecular weight | 17,000 |
| Refractive index | 1.580 |
| Particle size distribution (percent): | |
| On 10 mesh | 0 |
| On 20 mesh | 53.4 |
| On 40 mesh | 37.7 |
| On 60 mesh | 5.8 |
| On 80 mesh | 1.1 |

While nylon 66 or a copolymer thereof, such as a copolymer (various proportions) of nylon 66 and nylon 6 are the preferred polyamides, other polyamides such, for example, as polyepsilon caprolactam (nylon 6), or polyomega-amino-undecanoic acid (nylon 11) may also be employed.

The polyamide may modify the support material basically in one of two ways:

(i) In a highly advantageous and preferred embodiment, at least a proportion of the silica or silicate materials, say, kieselguhr, is encapsulated or coated (partially or completely) with a polyamide resin. This may be accomplished, for example, by precipitating the resin from solution, say, with an acid like hydrochloric acid onto individual kieselguhr particles, advantageously while stirring, then separating the polyamide-modified kieselguhr from the solution, as, for instance, by filtration.

The polyamide-modified kieselguhr material obtained by this procedure is believed to be a unique composition of matter, and has a quite different physical form from both the original polyamide and the kieselguhr. The separated and dried material, typically takes the form of a white, greyish-white or pink mass, and comprises a coherent, though friable, assembly of kieselguhr particles coated with the polyamide resin that retains the porosity of the original kieselguhr. Individual particles can be readily separated and detached from the mass, for instance, by grinding the material in a blender or grinder. Examination of individual particles reveals that they are composed primarily of kieselguhr, more or less as a core, with an irregular surface layer of the polyamide resin. The dissemination of the polyamide over the kieselguhr in this way, serves markedly to enhance the surface area, and hence the adsorptive capacity, of the polyamide. Moreover, since the polyamide is dissolved in solution in the formation of this composition, it need not be of the high quality required when (as in the prior art) it is added as a powder.

(ii) Alternatively, the polyamide resin, in powder form, is combined with a kieselguhr material in such a way that ensures a fairly uniform distribution of the polyamide particles in juxtaposition with the kieselguhr particles.

For instance, the two materials may be blended together in a hammer or ball mill. Frequently, a more uniform distribution of the polyamide resin and the kieselguhr particles may be achieved by combining the materials in a slurry. In many instances, an aqueous slurry will serve such a purpose. The physical admixture of polyamide and kieselguhr so-obtained, is found by experiment to be more effective than the prior art polyamide treatment, but not as effective, nor as economic, as the novel composition of matter obtained from procedure (i) above.

The modified material is then brought into a physical form suitable for passing beer therethrough, so that the beer contacts the modified material. For instance, the material may simply be packed into a column through which the beer can be passed. Alternatively, the material may be formed into a filter bed supported on conventional filter support material such, for example, as sheets of cellulose asbestos.

The amount of polyamide-modified kieselguhr needed to remove a useful proportion of haze-forming solute components, typically anthocyanogens, from beer naturally varies from beer to beer according to the solute content thereof as well as the adsorptive capacity of the polyamide and/or kieselguhr. However, we have found in practice that around 30 gms. of material containing about 7% by weight polyamide resin and about 93% by weight kieselguhr is usually effective in treating a barrel of a regular beer passed therethrough, and this is very satisfactory from an economic standpoint. In any event, for a standard beer being produced on a routine basis, the minimum amount of material needed can be readily determined by a few straight-forward, comparative experiments.

An important feature associated with the practice of this invention, derives from our subsidiary finding that a marked increase in the adsorptive capacity of the polyamide-modified kieselguhr filtration material can be attained by acid washing, particularly with a mineral acid such as HCl, the kieselguhr and/or the modified material. When the modification results from precipitating the polyamide resin from solution onto, and around, the kieselguhr particles, this acid treatment is conveniently effected by using a mineral acid as the carrier for the polyamide. The preferred mineral acid is hydrochloric acid, but other acids, such as concentrated sulfuric acid, in which the particular polyamide is soluble, or partially soluble, may be employed.

The adsorptive capacity of the polyamide modified material may be regenerated, conveniently by washing with alkalis such as sodium hydroxide, or a dilute hypochlorite bleach solution as taught in the specification of our Canadian Pat. No. 793,284.

Also, in accordance with prior techniques, additional treatments for stabilising and clarifying beer may concurrently be employed. These additional steps include the use of reducing agents such as metabisulfites, or preferably sulfur dioxide itself, in accordance with U.S. Pat. No. 2,916,377 dated Dec. 8, 1959. It is also common practice to employ a proteolytic enzyme such as bromelin and/or papain. The use of these other materials in the present process is unchanged from prior art techniques in any respect such as quantities employed or point in the brewing process where added. For example, when $SO_2$ in the form of sodium metabisulfite is used it may be introduced in the range of about 5 to 20 parts per million as $SO_2$, and the enzyme dosage may be between about 500–15,000 activity units per 100 barrels of beer.

The following examples will further illustrate methods for preparing the polyamide-modified kieselguhr materials, and demonstrate the highly successful results obtained when using the modified materials in accordance with the present invention to clarify and stabilise lager beer. This is merely illustrative of the beer, such as lager, porter, stout, bock, ale and malt liquor which may be utilized. The invention is effective with each of these beverages.

EXAMPLE 1

This example illustrates the preparation of a suitable filter bed comprising polyamide-modified kieselguhr materials.

10 gms. "Polypenco," a poly(hexamethylene adipamide) (nylon 66) polymer marketed by Polypenco Canada Limited, Industrial Plastics Division, Ontario, Canada, in powder form, was added to 100 ml. conc. HCl in a beaker, and the mixture stirred overnight to dissolve the nylon. If need be, the mixture may be heated, say to 90–100° C. to hasten solvation of the nylon. Thereafter, the nylon solution so-obtained was poured into 5 litres cold water containing approximately 120 gms. "Fibraflo" Grade 4C, a filter-grade kieselguhr. The contents were vigorously stirred with a mechanical stirrer for 5 minutes. During this time, the nylon was thrown out of the hydrochloric acid solution, and precipitated onto, and around, individual kieselguhr particles. The contents were then filtered on a Buchner filter funnel, and the solid residue resuspended in 2 litres of water and refiltered. The nylonised diatomaceous earth so-obtained was air-dried overnight. The dried material was in the form of a white coherent, three-dimensional mass of interlaced, randomly oriented strands. The fibrous character of the material was indicated by the ease with which individual fibrous-like strands, resembling fibrils, could be detached therefrom. Examination of individual strands showed a core composed of the kieselguhr material, surrounded at irregular intervals along its length by a polyamide coat which, in numerable instances, served to coalesce adjacent strands into a coherent, three-dimensional reticulated mass. In the foregoing procedure, therefore, the physical form both of the nylon and the kieselguhr has been altered with the formation of a polyamide-modified kieselguhr composite material, and a dramatic increase in the surface area and adsorptive capacity of the nylon. This particular material contained 7.7% by weight polyamide and 92.3% by weight kieselguhr.

It was formed into a filter bed adapted for the passage of beer therethrough, by, first, shredding the friable material into a more or less powdered mass with particles several microns in diameter using a Waring Blendor for 10 seconds. Thereafter, the shredded material was packed uniformly into a glass column 6 inches long and 4 inches in diameter, to form a compact, but highly porous filter bed with a large surface area presenting a significant area of polyamide and kieselguhr surface, for subsequent adsorption of haze-forming components from beer passed through the column.

EXAMPLE 2

This example illustrates the preparation of a filter material in the form of a physical admixture of polyamide resin and gieselguhr. 120 gms. "Fibraflo" Grade 4C and 10 gms. "Polypenco" poly(hexamethylene adipamide) (nylon 66) were intimately blended together by agitating in a Waring Blendor. The resulting composite material comprised a porous kieselguhr matrix with nylon particles distributed fairly uniformly throughout.

The following examples illustrate the application of the polyamide-modified kieselguhr filter materials in stabilising and clarifying beer.

In these examples, reference will be made to a Forcing Test haze which is a standard test used to predict the stability of a particular beer in the interval before consumption. In this instance, the test involved the following procedure:

Store beer: 120° F. for 7 days
Then store beer: 32° F. for 1 day
Then read haze on a Radiometer type haze meter (available from The London Company, Ohio) while the beer is still at 32° F.

The haze is measured in F.T.U.'s (Formazin type units of the American Society of Brewing Chemists—A.S.B.C. Proceedings 1957, page 165).

Generally speaking, a commercial beer should have a Forcing Test haze value less than 200 F.T.U.'s.

Note: 1 E.B.C. unit=69 F.T.U.'s.

The haze so-determined by this 1 week forcing test represents both permanent non-biological haze and reversible soluble chill haze. The value obtained correlates well with the 3 month stability value when the beer is stored at room temperature for 3 months, then chilled to 32° F. for 1 day and the haze then determined on the Radiometer.

The correlation of Radiometer F.T.U.'s with appearance under normal light is as follows:

0 to 200 F.T.U.'s: Beer is clear
300 to 400 F.T.U.'s: Beer has slight veil
450+ F.T.U.'s: Beer has definite haze.

EXAMPLE 3

Two 40 liter batches of lager beer fresh from the conditioning tanks and prepared and processed in the usual manner, were employed in this experiment. Samples were taken from each batch and bottled at the beginning of the tests. The remainder of one batch (Batch A) of beer was then passed through the column of polyamide-modified kieselguhr filter material prepared by the procedure of Example 1. The filtration time was 10 minutes. Thereafter, the filtered beer was carbonated, bottled and pasteurised. The remainder of the other batch of beer (Batch B), for comparative purposes, was clarified and stabilised by a standard treatment involving the addition thereto of 6.8 gms. of "Clearfil," a synthetic silicate powder (commercially available from Schwarz Services International, Mount Vernon, N.Y.), conventionally employed for this purpose, and the beer and powder mixed by stirring occasionally over a 60 minute period. Thereafter, the beer was carbonated, filtered, bottled and pasteurised. In both instances, the haze present in the bottled beer was determined before and after the treatment, and following a 1 week forced haze test. The results are indicated in Table III below:

TABLE III

| Batch | Treatment | Initial haze | 1 week F.T. | Isohumolone content |
|---|---|---|---|---|
| A | Before | 85 | 105 | 13 |
|   | After filtration | 40 | 50 | 13 |
| B | Before | 80 | 120 | 13 |
|   | After Clearfil addition | 45 | 105 | 12 |

The bitterness and foam-stability of the original beer was unimpaired by the filtration through the polyamide-modified kieselguhr. The low reading (50) obtained in the 1 week Forcing Test compared with 105 for the conventionally treated beer indicates that the shelf life of the beer is significantly extended by this treatment.

EXAMPLE 4

This example illustrates the regeneration of the polyamide-kieselguhr filter aid used in the previous example by washing with a bleaching agent.

250 ml. of a commercial bleach solution ("Javex"—a household bleach—5.2% available chlorine—commercially available from Bristol-Myers, Canada), was diluted with 1000 ml. tap water to give a 1% solution of available chlorine. The used filter cake was then washed with this solution (by stirring together in a beaker) which removed the brownish tannin stain on the nylon. After 20 minutes, another 250 ml. of water was added to the mixture. The pH after this water addition was 10.6. The mixture was further stirred for 25 minutes. Thereafter, the slurry was filtered, and the solid residue resuspended twice in 2 liters water, finally filtered, dried and ground in a blender. The regenerated material was similar in appearance to the original material.

3 batches of lager beer fresh from the same conditioning tank were obtained. A sample from each batch was bottled prior to the test, and the haze determined by a Radiometer haze meter. The remainder of each batch was then filtered through:

Batch A: 120 g. "Fibraflo" 4C acting as control
Batch B: 120 g. polyamide-kieselguhr filter material regenerated by the procedure of this example
Batch C: A filter material prepared according to the procedure of Example 2 and comprising 120 gm. "Fibraflo" 4C intimately admixed with 10 gm. "Polypenco" nylon powder The filtration time was about 10 minutes in each case. In each of the 3 instances, the filtered beer was carbonated, bottled and pasteurised. A 1 week forced haze test was then conducted on sample bottles from each batch. The results of the 2 series of haze tests are summarised below in Table IV.

TABLE IV

| Batch | Treatment | Initial haze | 1 week F.T. | Isohumolone content |
|---|---|---|---|---|
| A | Control | 40 | 75 | 16 |
| B | Regenerated filter material | 40 | 40 | 17 |
| C | Filter material of Example 2 | 40 | 50 | 17 |

EXAMPLE 5

This example illustrates (a) the superiority of the filter material prepared in accordance with the procedure of Example 1, i.e. polyamide precipitated on kieselguhr, and (b) the synergistic action manifest by the polyamide-kieselguhr combinations.

In this example, a quantity of lager beer fresh from the conditioning tank was employed. A haze determination was made on the beer before the test was begun. Aliquot (12 fluid ounce) portions of the beer were then removed from the batch, and filtered according to the following procedures:

Sample A: Control—no filter treatment
Sample B: Filtered simply through 120 gm. "Fibraflo" 4C
Sample C: Filtered through 120 gm. "Fibraflo" 4C mixed with 10 gm. "Polypenco" nylon powder according to the procedure of Example 2
Sample D: Filtered simply through 10 gm. "Polypenco" powder
Sample E: Filtered through 120 gms. nylonised "Fibraflo" 4C containing 10 gms. "Polypenco" prepared according to the procedure of Example 1

The filtration time for Sample D was significantly higher than that for the other samples.

A 1 week force haze test was then carried out on each of the Samples A–E, and the isohumolone content determined. The results are summarised in Table V below, and additionally the haze determinations illustrated by the graph of FIG. I of the accompanying drawings.

TABLE V

| Sample | Treatment | Initial haze | 1 week F.T. | Isohumolone content |
|---|---|---|---|---|
| A | No filtration control | 50 | 130 | 17 |
| B | Kieselghur alone | 45 | 100 | 16 |
| C | Kieselguhr and nylon | 50 | 50 | 17 |
| D | Nylon alone | 55 | 70 | 16 |
| E | Nylonised filter aid | 45 | 35 | 16 |

A synergistic effect on beer stability obtained by combining together kieselguhr and nylon, especially marked when (cf. Sample E) the nylon is precipitated onto the kieselguhr is clearly shown by the above results.

As will be understood, the forms of the invention herein shown and described are to be considered only as preferred embodiments thereof, and various changes may be made without departing from the spirit and scope of the invention or sacrificing its material advantages.

What is claimed is:

1. A method of clarifying and stabilising a fermented beverage fluid which comprises filtering a fermented beverage fluid through a filter bed comprising a composition of matter containing between about 2 and about 30 percent by weight of polyamide resin and between about 70 and about 98 percent by weight of kieselguhr, said polyamide being coated on said kieselguhr, said coating of said polyamide on said kieselguhr being achieved by means of acid precipitation of said polyamide from solution onto said kieselguhr, and said composition being in strand form or being particles obtained from said strands.

2. A method as claimed in claim 1 wherein the polyamide resin present in the composition of matter is selected from the group consisting of poly(hexamethylene adipamide) and copolymers of poly(hexamethylene adipamide) with poly(epsilon caprolactam).

3. A method as claimed in claim 1 wherein the kieselguhr has a particle size of between about 4 and about 40 microns and a high surface area.

4. A method as claimed in claim 1 wherein the composition of matter contains between about 5 and about 20 percent by weight, based on the weight of kieselguhr, of the polyamide resin.

5. In the clarification and stabilisation of beer, the step of filtering the beer through a filter bed comprising a composition of matter containing between about 2 and about 30 percent by weight of a polyamide resin selected from the group consisting of poly(hexamethylene adipamide) and copolymers of poly(hexamethylene adipamide) and poly(epsilon caprolactam) and between about 70 and about 98 percent by weight kieselguhr, said polyamide resin being coated on said kieselguhr, said coating of said polyamide on said kieselguhr being achieved by means of acid precipitation of said polyamide from solution onto said kieselguhr, and said composition being in strand form or being particles obtained from said strands.

References Cited

UNITED STATES PATENTS

| 3,424,588 | 1/1969 | Dehman et al. | 99—48 |
| 3,436,225 | 4/1969 | Raible | 99—48 |
| 3,413,120 | 11/1968 | Achenbach et al. | 99—48 |

FOREIGN PATENTS

| 639,366 | 4/1962 | Canada | 99—48 |
| 465,692 | 5/1937 | Great Britain | 99—48 |

RAYMOND N. JONES, Primary Examiner

D. M. NAFF, Assistant Examiner